United States Patent [19]

Mukai

[11] Patent Number: 5,759,617
[45] Date of Patent: Jun. 2, 1998

[54] PRODUCTION PROCESS FOR A HARD DISK MAGNETIC RECORDING MEDIUM

[75] Inventor: Ryoichi Mukai, Kawasaki, Japan

[73] Assignee: Fujitsu Limited, Kawasaki, Japan

[21] Appl. No.: 825,628

[22] Filed: Mar. 31, 1997

[30] Foreign Application Priority Data

May 20, 1996 [JP] Japan ................................. 8-124873

[51] Int. Cl.$^6$ ............................................. B05D 5/12
[52] U.S. Cl. ........................ 427/130; 427/131; 427/132; 427/294; 427/383.1; 427/398.4; 427/404
[58] Field of Search .......................... 427/130, 131, 427/132, 294, 383.1, 398.4, 404

[56] References Cited

FOREIGN PATENT DOCUMENTS

| | | |
|---|---|---|
| 61-129105 | 2/1986 | Japan. |
| 426920 | 1/1992 | Japan. |
| 5205262 | 8/1993 | Japan. |
| 562188 | 8/1993 | Japan. |
| 5234071 | 9/1993 | Japan. |
| 5325183 | 12/1993 | Japan. |
| 6325355 | 11/1994 | Japan. |
| 896340 | 4/1996 | Japan. |

*Primary Examiner*—Bernard Pianalto
*Attorney, Agent, or Firm*—Greer, Burns & Crain, Ltd.

[57] ABSTRACT

The present invention discloses a production process for a hard disk magnetic recording medium in which post-annealing is performed after vacuum deposition of a non-magnetic base layer and magnetic metal polycrystalline layer on a substrate without forming a protective layer and without destroying the vacuum.

12 Claims, 5 Drawing Sheets

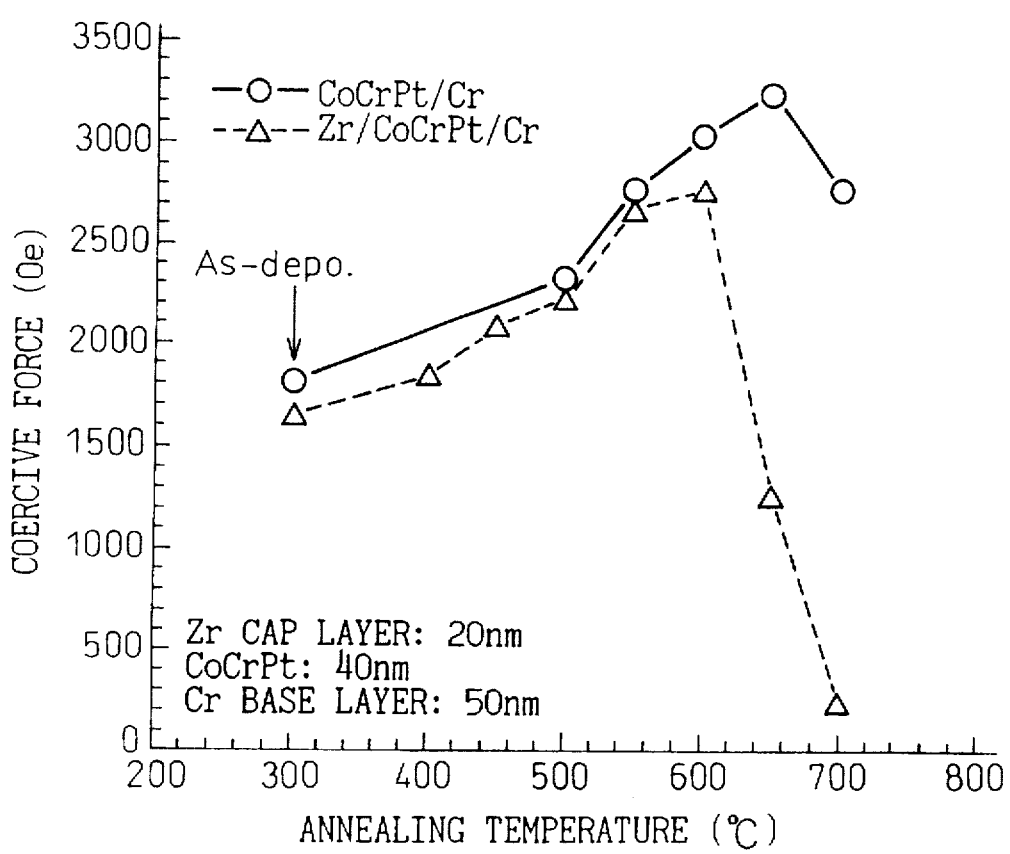

PRODUCTION PROCESS FOR A HARD DISK MAGNETIC RECORDING MEDIUM

BACKGROUND OF THE INVENTION

1. Field of the Invention

The present invention relates to a production process for a magnetic recording medium for hard disks (HD).

2. Description of the Related Art

In order to improve the performance of hard disks (HD), it is considered important to simultaneously achieve high recording density and low noise. A high level of coercivity is indispensable for attaining higher recording density. In order to achieve this objective, it is necessary to produce fine magnetic particles (in the case of polycrystals, crystal grains or the magnetic region within crystal grains separated by a non-magnetic region) of a size equal to or smaller than the critical size of a single magnetic domain, and isolating those particles so that the magnetic coupling between magnetic grains is eliminated.

In order to overcome the technical problems described above, crystal grains had conventionally been isolated by adding a non-magnetic material to a magnetic material during formation of the magnetic film of a polycrystalline structure, allowing the non-magnetic material to accumulate, and precipitating the non-magnetic material on the crystal grain boundary simultaneous to that accumulation (IEEE Transactions on Magnetics, Vol. 29, No. 6, Nov. 1993, pp. 3685–3687).

Moreover, in order to make this precipitation phenomenon more pronounced, a method for forming an HD medium is employed wherein after sequentially depositing a base layer, magnetic layer and protective layer, the resulting structure is exposed to the air and post-annealing is performed in a low vacuum oven.

In addition, since the magnetic film grows heteroepitaxially relative to the reduced size of the crystal grains, this was dealt with by decreasing the fineness of the crystals of the base layer by forming the base layer into a thinner film since it determines the size of the crystal grains.

In those methods of the prior art that attempted to segregate a non-magnetic material at the grain boundary simultaneous to accumulation, the coercivity is being lowered since precipitation of the added material is easily inhibited and the non-magnetic added material is contained in the magnetic crystal grains at levels equal to or greater than the solid solution limit.

On the other hand, even in the case of methods in which post-annealing is performed after deposition of the protective film, due to the occurrence of reaction between the protective film and magnetic film during this annealing procedure, a problem is encountered in which the attaining of high coercive strength is inhibited.

In addition, if the base layer is made thinner in order to reduce crystal grain size, a problem occurs in which it is no longer possible to obtain a crystal orientation suitable for obtaining a magnetic film having superior magnetic properties.

SUMMARY OF THE INVENTION

In order to solve the above-mentioned problems, the inventors of the present invention developed a technology for performing annealing without depositing a protective film after sequentially depositing a non-magnetic base layer and magnetic film of a polycrystalline structure. In this technology, a vacuum state is maintained until completion of post-annealing in order to suppress deterioration of magnetic performance caused by oxidation phenomena of the magnetic layer before and during annealing. The inhibition of high levels of coercivity caused by reaction with the protective layer, which had been a problem in the prior art, is avoided and adequate segregation of non-magnetic material on the crystal grain boundary of the magnetic film is realized. Moreover, both isolation and reduced size of the magnetic particles are substantially realized by enabling both non-magnetic regions and magnetic regions to coexist within the crystal grains. Furthermore, it was also found that by sequentially depositing a non-magnetic base layer and magnetic film of a polycrystalline structure at a substrate temperature, equal to or below room temperature, at which segregation of non-magnetic materials at the crystal grain boundary simultaneous to deposition is not promoted, both isolation and reduced particle size could be easily realized.

Namely, the object of the present invention is to provide a production process of a hard disk magnetic recording medium having a magnetic metal polycrystalline layer on a non-magnetic substrate with a non-magnetic base layer in between, and a protective layer on said magnetic metal polycrystalline layer said process comprising: depositing said non-magnetic base layer on said non-magnetic substrate in a vacuum, depositing said magnetic metal polycrystalline layer on said non-magnetic base layer without destroying said vacuum, post-annealing said non-magnetic substrate deposited with said magnetic metal polycrystalline layer prior to deposition of said protective layer without destroying said vacuum, to disperse and segregate components of said non-magnetic base layer at the crystal grain boundaries of said magnetic metal polycrystalline layer, and then forming a protecting layer.

Non-magnetic materials such as aluminum, glass, quartz, carbon and silicon are used for HD substrate materials. HD substrates have excellent resistance to impacts, can be made to be thin, and are rugged enough to be suitable for high-speed rotation. The surfaces of these substrates are normally textured after forming a layer of $Ni_3P$, $SiO_2$ and so forth.

Although typical examples of materials of the magnetic metal polycrystalline layer include Co or Co alloys such as CoCr, CoCrPt and CoCrTa, Ni, Fe, rare earth metals or alloys having these metals for their main ingredient may also be used. Moreover, non-magnetic materials such as Cr, $SiO_2$ and $ZrO_2$ may be added.

The magnetic metal polycrystalline layer of the present invention is composed of the polycrystalline phase of a magnetic metal or its alloy, and the components of the non-magnetic base layer are dispersed and segregated at its crystal grain boundary by post-annealing. The magnetic compiling between magnetic crystal grains is therefore inhibited and eventually eliminated. Although a non-magnetic grain boundary phase is formed at the crystal grain boundary, it is different from a so-called granular structure in which a magnetic crystalline phase is dispersed in granular form within a non-magnetic layer. Although there are no limitations on the average crystal grain size of the magnetic crystalline layer, it is generally 10–30 nm and preferably 10–15 nm. Although there are also no limitations on the widthness of the non-magnetic grain boundary phase after post-annealing, it is typically 1–3 nm.

Although the thickness of the magnetic layer is not limited, it is generally 10–40 nm, and preferably 20–30 nm at which tBr value is 100 μm·G.

This type of magnetic metal can typically be deposited as a polycrystalline layer by sputtering, vacuum deposition and so forth. Magnetron sputtering and bias sputtering are preferable.

The non-magnetic base layer is formed for the purpose of promoting growth of the magnetic metal polycrystalline layer. In addition to Cr or Cr alloys, NiP and CrMo layers are typically used for typical magnetic layers composed of Co or Co alloys. As a result, the C axis of the Co or Co alloy layer is deposited (grows) parallel to the substrate surface. In addition, Ti or Ti alloy layers are also preferable base layers. Although there are no limitations on the thickness of the base layer, it is typically 20–50 nm thick.

In the present invention, grain boundary interaction between magnetic metal crystal grains is inhibited by dispersing and segregating the components of this base layer along the ground boundary of the magnetic metal polycrystalline layer by post-annealing. Consequently, the noise of the magnetic recording layer is prevented.

On the other hand, if carbon, a typical protective film material, is present on the magnetic layer, it reaches the base layer surface by going through the crystal grain boundary during post-annealing. Since a phase is formed there that inhibits dispersion of base layer components along the magnetic layer grain boundary, post-annealing is performed without forming a protective layer in the present invention.

In addition, since the exposed magnetic layer is annealed without a protective layer, an oxidation film is formed on the surface when this magnetic layer deposited on a substrate is exposed to the air. Since this oxidation film aggregates during post-annealing resulting in the occurrence of surface roughness, post-annealing is performed without destroying the vacuum after depositing the magnetic layer.

Although post-annealing should be performed at a temperature of, for example, 500°–700° C., in the case of using materials like $NiP_3$ for the substrate in which crystal transformation occurs that eventually leads to the acquisition of magnetism, annealing should be performed at a temperature below that crystal transformation temperature (370° C). In addition, in the case of using a material like aluminum that has a low softening temperature, annealing should be performed at a temperature below that temperature (660° C. in the case of aluminum).

The present invention is characterized by dispersing and segregating the non-magnetic components from a non-magnetic base layer in a magnetic metal polycrystalline layer by performing post-annealing prior to forming a protective film on the magnetic metal polycrystalline layer and without destroying the vacuum. However, recording performance can be improved by forming a plurality of layers of the magnetic metal polycrystalline layer. At this time, a non-magnetic base layer is inserted between the magnetic metal polycrystalline layer layered on top and the metal magnetic polycrystalline layer below it. However, a non-magnetic layer and a protective layer are not formed on the uppermost magnetic metal polycrystalline layer prior to post-annealing which is performed without destroying the vacuum. A non-magnetic layer is never inserted below the protective layer and above the uppermost magnetic metal polycrystalline layer in the present invention. If a non-magnetic layer is present here, the distance between the magnetic head and magnetic metal polycrystalline layer increases resulting in decreased magnetic recording and playback properties.

A protective film of a recording medium is formed on a magnetic layer. The protective film protects the recording layer (magnetic layer) from damage caused by the recording head while also providing lubricating effects. Typical examples of materials used for the protective film include carbon, diamond and zirconium. The thickness of the protective layer is typically 10–20 nm.

In addition, according to the present invention, by performing the above-mentioned post-annealing after depositing a non-magnetic base layer and then magnetic metal polycrystalline layer at room temperature, coercivity can be improved more than in the case of performing post-annealing after depositing while heating.

BRIEF DESCRIPTION OF THE DRAWINGS

FIG. 4 shows the changes in coercivity caused by post-annealing between the present embodiment and a comparative example.

DESCRIPTION OF THE PREFERRED EMBODIMENTS (a) Production of a Hard Disk (HD) Magnetic Recording Medium according to the Present Invention The process flow is shown in FIG. 1. Referring to FIGS. 2A and 2B, after sequentially depositing non-magnetic base layer 2 and magnetic layer 3 on substrate 1 in a vacuum, post-annealing is performed while maintaining this vacuum state. After cooling the substrate to room temperature, a protective film 4 is deposited on the magnetic layer to produce an HD magnetic medium. Non-magnetic materials such as aluminum, glass, quartz, carbon or silicon were used for the substrate material, and either $Ni_3P$ or $SiO_2$ was formed on these substrates. Cr or $Ni_3P$ was used to form the non-magnetic base layer at a thickness of 30–50 nm, while either Co, Ni, Fe, a rare earth metal or an alloy, to which had been added one or a plurality of these with a non-magnetic material such as Cr, $SiO_2$ or $ZrO_2$, was used to form the magnetic layer by sputtering at a thickness of 20–40 nm. Post-annealing was performed for approximately 1 minute at a temperature of 350°–700° C.

Figure 1:
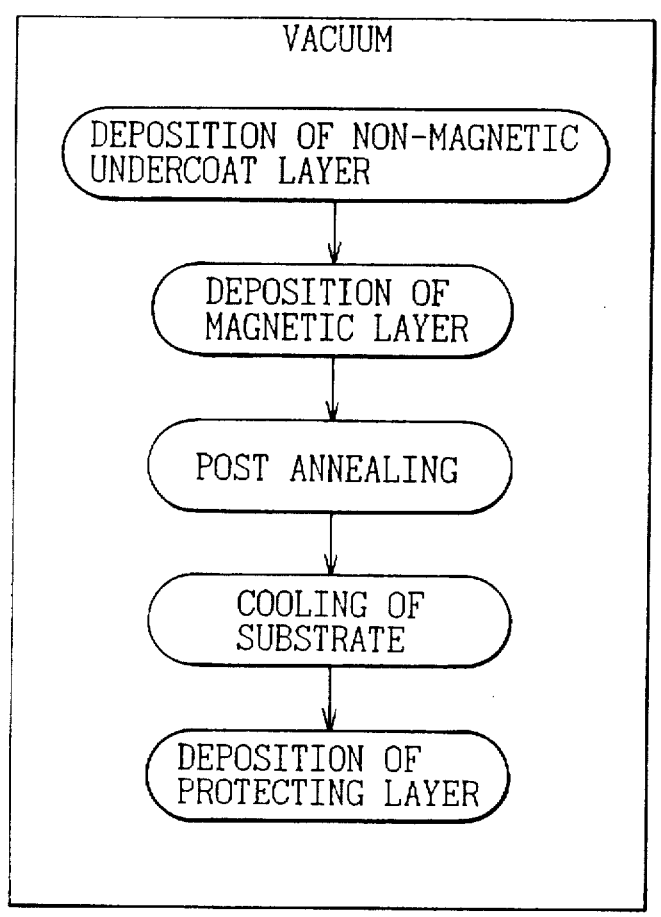
FIG. 1 shows the process flow of a first embodiment of the present invention.
Figure 2A:
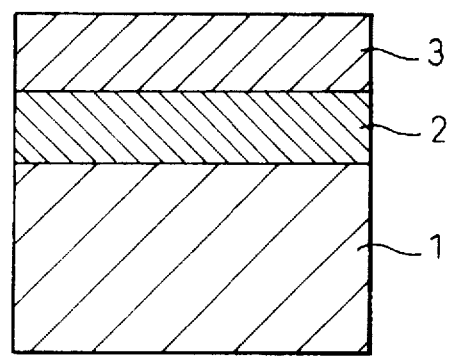
FIGS. 2A and 2B are schematic cross-sectional views of the HD magnetic recording medium of the above-mentioned first embodiment of the present invention.
Figure 2B:
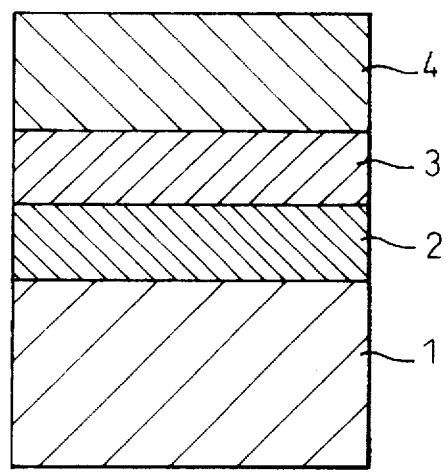
Figure 3A:
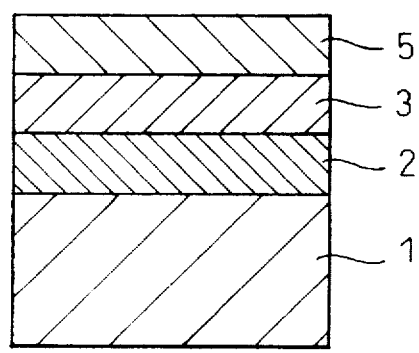
FIGS. 3A and 3B are schematic cross-sectional views of a magnetic recording medium having a sandwich structure of another embodiment of the present invention.
Figure 3B:
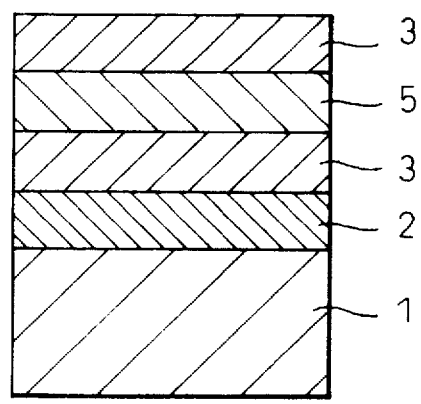

(b) Production of a Hard Disk (HD) Magnetic Medium Using a Multi-layer Structure As shown in FIGS. 3A and 3B, an HD magnetic medium was produced by performing post-annealing after forming a multi-layer structure consisting of alternating layers of magnetic layer 3 and Cr layer (non-magnetic layer) 5. Cr layer 5 had thickness of approximately 3 nm, while magnetic layer 3 had thickness of approximately 10 nm. These layers were all deposited by sputtering.

(c) Example of the Prior Art

A recording medium was produced by depositing a base Cr layer 2, a magnetic CoCrPt layer 3 and a protective layer in the form of Zr layer 4 on a substrate.

Moreover, this recording medium was post-annealed.

The changes in the coercivity of the recording medium at this time are shown in FIG. 4. The triangles indicate the results for the example of the prior art. Coercivity can be seen to improve as a result of post-annealing.

(d) Comparison with the Present Invention

FIG. 4 also shows the changes in coercivity in the case of forming a Zr layer 4 after post-annealing without destroying the vacuum following deposition of a CoCrPt layer 3 before depositing a Zr layer 4 (indicated with circles in the graph).

The embodiment of the present invention demonstrated higher coercivity than the example of the prior art for as-deposited and at all annealing temperatures. Moreover, although coercivity decreased abruptly when the annealing temperature exceeded 600° in the example of the prior art, coercivity continued to increase up to 650° C. in the embodiment of the present invention.

The improvement in coercivity indicates that the interaction between crystal grains of the magnetic metal polycrystalline layer has decreased. This means that noise also decreases, S/N ratio is improved and improved reliability is achieved. The decrease in S/N ratio enables the magnetic layer to be made thinner (decrease in noise corresponding to decrease in output), thus making it possible to achieve higher density recording. In addition, improvement of coercivity itself makes it possible to record onto smaller regions, which is also effective in realizing high recording density.

(e) Effect of Denosition Temperature on Increased Coercivity

Figure 5:
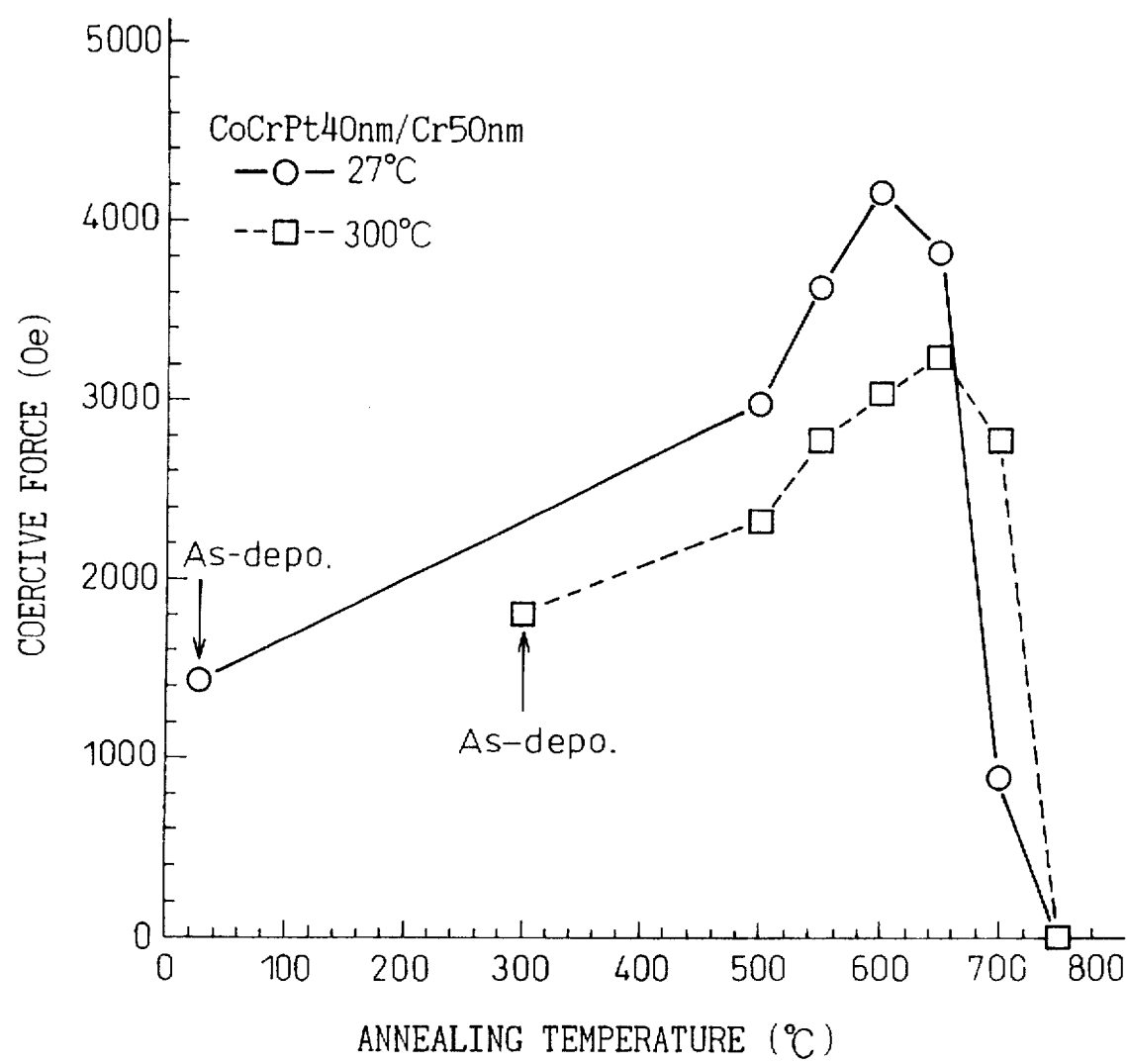
FIG. 5 shows the differences in post-annealing effects due to differences in deposition temperature.

FIG. 5 shows the results of changing the deposition temperature of the Cr base layer and CoCrPt magnetic layer when carrying out the technology of the present invention. This graph shows the results of comparing deposition temperatures of room temperature (27° C.) and 300° C. Forming a medium using the technology of the present invention with the deposition temperature at room temperature was confirmed to consistently yield a high coercivity at a specific post-annealing temperature.

Deposition at low temperatures enables the formation of a film having a lower degree of crystallinity, which is thought to promote dispersion and segregation of Cr during post-annealing.

According to the present invention, selecting the crystal film structure of the magnetic layer prior to post-annealing as well as the process, made it possible to efficiently realize the generation of pronounced precipitation phenomena of a non-magnetic material onto a crystal grain boundary obtained by the use of post-annealing as well as a biphasic separation state in which isolated magnetic regions are formed within crystal grains, thereby resulting in a high coercivity and low noise levels.

I claim:

1. A production process for a hard disk magnetic recording medium having a magnetic metal polycrystalline layer on a non-magnetic substrate with a non-magnetic base layer inbetween, and a protective layer on said magnetic polycrystalline layer, said process comprising:

depositing a non-magnetic base layer on a non-magnetic metal substrate in a vacuum, depositing a magnetic metal polycrystalline layer on said non-magnetic base layer without destroying said vacuum, post-annealing said non-magnetic substrate with said magnetic metal polycrystalline layer prior to deposition of said protective layer without destroying said vacuum, to disperse and segregate components of said non-magnetic base layer at the crystal grain boundaries of said magnetic metal polycrystalline layer and then forming said protecting layer.

2. A process as set forth in claim 1 wherein said magnetic metal polycrystalline layer is Co or a Co alloy.

3. A process as set forth in claim 1 wherein said non-magnetic base layer is Cr or a Cr alloy.

4. A process as set forth in claim 1 wherein said protective layer is carbon.

5. A process as set forth in claim 1 wherein the temperature of said post-annealing is 350°–700° C.

6. A process as set forth in claim 1 wherein the deposition of said non-magnetic base layer and said magnetic metal polycrystalline layer is performed either while heating to a low temperature of 100° C. or less or without heating at all.

7. A process as set forth in claim 1 wherein a non-magnetic layer of a material able to function as a non-magnetic base layer is deposited on said magnetic metal polycrystalline layer, a second magnetic metal polycrystalline layer is deposited on said layer, and thereafter said non-magnetic substrate on which has been deposited said two magnetic metal polycrystalline layers is post-annealed without destroying said vacuum before depositing said protective layer, followed by formation of said protective layer.

8. A process as set forth in claim 7 wherein said post-annealing is performed after layering one or more magnetic metal polycrystalline layers.

9. A process as set forth in claim 1 said magnetic metal polycrystalline layer is Co or a Co alloy to which has been added $SiO_2$ or $ZrO_2$.

10. A process as set forth in claim 1 wherein said magnetic metal polycrystalline layer is Ni, Fe, a rare earth metal or an alloy having for its main component any one of these metals.

11. A process as set forth in claim 1 wherein said non-magnetic substrate contains a material that exhibits magnetism as a result of crystal transformation, and the temperature of said post-annealing is lower than that crystal transformation temperature.

12. A process as set forth in claim 1 wherein said non-magnetic base layer and said magnetic metal polycrystalline layer are deposited at room temperature followed by said post-annealing.

* * * * *

UNITED STATES PATENT AND TRADEMARK OFFICE
CERTIFICATE OF CORRECTION

PATENT NO. : 5,759,617
DATED : June 2, 1998
INVENTOR(S) : Ryoichi Mukai

It is certified that error appears in the above-identified patent and that said Letters Patent is hereby corrected as shown below:

TITLE PAGE:

Under "[56] References Cited" and "Foreign Patent Documents" delete "61-129105 2/1986 Japan" and insert --61-29105 2/1986 Japan-- therefor Column 5, line 18, delete "Denosition" and insert --Deposition-- therefor Signed and Sealed this Twenty-seventh Day of October, 1998

Attest:

BRUCE LEHMAN

*Attesting Officer*  *Commissioner of Patents and Trademarks*